United States Patent Office 3,219,595
Patented Nov. 23, 1965

3,219,595
PRODUCTION OF POLYMERS FROM CYCLIC ETHERS WITH $B_{10}H_{10}[C(COCl)]_2$ AS CATALYST
Samuel I. Trotz, New Haven, Conn., assignor to Olin Mathieson Chemical Corporation, a corporation of Virginia
No Drawing. Filed Sept. 21, 1962, Ser. No. 225,366
16 Claims. (Cl. 260—2)

This invention relates to the preparation of polymers from cyclic ethers and, in particular, this invention relates to a new process for the preparation of polymers from cyclic ethers in which $B_{10}H_{10}[C(COCl)]_2$ is employed as a catalyst.

Numerous references are found in the art in which the preparation of polymers of such cyclic ethers as tetrahydrofuran is described. Tetrahydrofuran polymers have been prepared with a wide variety of catalysts, such as fluosulfonic acid, pyrosulfuric acid, ferric chloride, aluminum chloride, and tin tetrachloride. For the most part the products obtained were oily liquids. In contrast, by the process of this invention solid tetrahydrofuran polymers having molecular weights in excess of 300,000 can be prepared.

The compound $B_{10}H_{10}[C(COCl)]_2$ which is used as a catalyst in the novel process of this invention, can be prepared conveniently according to the method described in John W. Ager, Jr., et al. application Serial No. 851,469, filed November 6, 1959 (now U.S. Patent 3,109,026). For example, the novel catalyst can be prepared by refluxing a mixture of $B_{10}H_{10}[C(COOH)]_2$ phosphorus pentachloride and carbon tetrachloride for a period of about 7 hours while chlorine is bubbled through the reaction mixture.

It has been found that cyclic ethers can be polymerized by bringing the ether into contact with the $$B_{10}H_{10}[C(COCl)]_2$$

catalyst or by bringing a preformed complex of the particular ether being polymerized with $B_{10}H_{10}[C(COCl)]_2$ into contact with the cyclic ether.

The quantity of the catalyst employed can be varied widely from about 0.001 to 5.0 percent based on the weight of the cyclic ether utilized. Preferably, from about 0.01 to about 1.0 percent of the $B_{10}H_{10}[C(COCl)]_2$ based on the weight of the cyclic ether being polymerized, is utilized in the novel process of this invention. In a like manner, the temperature at which the polymerization process of this invention is carried out can be varied over a wide range. Generally, the polymerization will be conducted in the range between about $-10°$ C. and $+150°$ C.

The compound $B_{10}H_{10}[C(COCl)]_2$ is a particularly advantageous catalyst in that it is highly effective in very low concentrations. The catalyst is an easily purified crystalline material which has a long shelf life and relatively good stability in the presence of air and moisture. This novel catalyst is effective in producing polymeric materials from cyclic ethers having inherent viscosities greater than 4.5. Products with molecular weights in excess of 300,000 have been obtained.

When tetrahydrofuran is polymerized by the process of this invention polymers having weight average molecular weights of from 1,000 to over 300,000 can be obtained. Inherent viscosities (0.1 percent in tetrahydrofuran at 30° C.) in excess of 4.5 are exhibited by these materials. From solutions of the tetrahydrofuran polymer products prepared by the process of this invention films can be laid down which exhibit outstanding durability, toughness and good adhesion. Molded articles can be prepared from these polymers and in manufacturing such articles the polymer can be molded alone or with fillers, dyes, or reinforcing agents. In addition, coating compositions can be prepared from these materials and they can be used clear or pigmented on wood, metal, etc.

If desired, aromatic and aliphatic hydrocarbons can be employed as solvents and diluents for carrying out the polymerization of the cyclic ethers according to the process of this invention. The use of the solvent or diluent permits a greater degree of control over the reaction temperature by providing for the dissipation of heat during the polymerization reaction.

The examples given below illustrate that the compound $B_{10}H_{10}[C(COCl)]_2$ is a versatile catalyst for the polymerization of cyclic ethers not having aromatic carbon to carbon unsaturation. Examples of such ethers are tetrahydrofuran, 1,3-dioxolane, epichlorohydrin, ethylene oxide, propylene oxide, trimethylene oxide, tetramethyethylene, oxide, glycidol, epicyanohydrin, cyclohexene oxide, vinylcyclohexene oxide, 1,4-epoxycyclohexane, octahydroisobenzofuran, beta-propiolactone, morpholine, N-methylmorpholine, oxetane, 3,3-bis(chloromethyl) oxetane, etc.

The invention is described in greater detail in the following specific examples which are illustrative and not intended to limit the scope of the invention.

*Example I*

The tetrahydrofuran used in this example was purified by first refluxing over sodium ribbon followed by distillation under nitrogen. It was then refluxed over lithium aluminum hydride and distilled therefrom just before its use in the polymerization reaction. To 1,000 parts of tetrahydrofuran purified in the manner described there was added 0.4 parts of freshly sublimed $B_{10}H_{10}[C(COCl)]_2$.

Polymerization was effected by maintaining the mixture of tetrahydrofuran and catalyst at 30° C. for 7 hours. The resulting solid, colorless polymer was cut into small pieces and dissolved as rapidly as possible in a large volume of warm tetrahydrofuran solvent containing 1 percent water. After a few drops of concentrated ammonia water had been added to neutralize any free acid, the mixture was slowly poured into a large volume of distilled water with vigorous stirring. The water was decanted, fresh distilled water was added and the mixture was boiled for 3 hours. After cooling, the polymeric product was spread out in thin layers and dried in a vacuum oven at 100° C. for 8 hours. The resulting solid white polymer represented a 31 percent conversion of the tetrahydrofuran to the polymer. The inherent viscosity of a sample of this material (0.1 percent in tetrahydrofuran at 30° C.) was determined to be 4.87. The polymer was found to have a weight average molecular weight of 310,000.

*Example II*

To 288 parts of tetrahydrofuran, purified in the manner described in Example I above, there was added 0.1 part of freshly sublimed $B_{10}H_{10}[C(COCl)]_2$ at room temperature. In 10 minutes the ether became viscous and after 45 minutes it had polymerized to a solid gel. After a total polymerization time of 4 hours, the polymer was purified in a manner identical to that described in Example I. The polymer product obtained was a white solid (68 percent conversion). The inherent viscosity of the polymer was measured and found to be 3.20 (0.1 percent in tetrahydrofuran at 30° C.).

*Example III*

A series of polymerizations were conducted at room temperature using 88 parts of purified tetrahydrofuran to each of 2.00, 1.00, 0.50, 0.25 and 0.10 parts of $$B_{10}H_{10}[C(COCl)]_2,$$

respectively. After 24 hours reaction at room temperature, the polymers obtained were saponified in a medium containing tetrahydrofuran, propylene glycol, water and an excess of potassium hydroxide. The resulting saponified mixtures were carefully neutralized with concentrated hydrochloric acid and the polymers precipitated in distilled water. The final purification of the polymer was effected by redissolving in tetrahydrofuran, reprecipitating in distilled water and vacuum drying at 100° C. Conversions of 55–65 percent were obtained. Intrinsic viscosities of 0.17, 0.29, 0.45, 0.72, and 1.31 respectively, were obtained (extrapolated to infinite dilution in tetrahydrofuran at 30° C.). The melting points of these polymeric products were 36° C., 38° C., 42° C., and 45° C., respectively. The lower molecular weight materials were brittle solids, whereas the higher molecular weight materials were fairly tough solids which could be milled into strong sheets. Molecular weight determinations were made and the respective molecular weights were found to be 4,570, 8,920, 15,500, 28,200 and 59,600.

*Example IV*

In this experiment 0.10 parts of freshly distilled $B_{10}H_{10}[C(COCl)]_2$ was added to 100 parts of epichlorohydrin. Considerable heat of reaction developed and this was controlled by external application of ice water. During the polymerization reaction the temperature was not allowed to exceed 50° C. After the initial polymerization reaction had subsided the reaction mixture was allowed to remain at room temperature for 24 hours. The resulting polymer was a greasy, semi-solid material.

*Example V*

To 200 parts of freshly distilled propylene oxide there was added to 0.10 part of freshly distilled $$B_{10}H_{10}[C(COCl)]_2$$

dissolved in 1 ml. of benzene. The reaction vessel, which was fitted with a Dry Ice condenser, was kept under a slight nitrogen pressure. The temperature of the reaction mixture during the exothermic polymerization reaction was controlled by a partial immersion of the reaction vessel in ice water. At no time was the reaction mixture allowed to exceed 25° C. The resulting viscous product obtained after the reaction mixture had been allowed to stand at room temperature for 24 hours was washed several times with water and the viscous liquid remaining was heated under vacuum for several hours. A 55 percent conversion of the propylene oxide to the final polymeric product, a viscous colorless liquid, was obtained.

*Example VI*

To 100 parts of beta-propiolactone there was added 0.05 part of freshly distilled $B_{10}H_{10}[C(COCl)]_2$. A sudden, polymerization reaction occurred. The product obtained was treated with boiling distilled water and, after cooling, a white solid polymer was obtained.

*Example VII*

To 100 parts of 3,3-bis(chloromethyl) oxetane monomer there was added 0.25 part of freshly distilled $$B_{10}H_{10}[C(COCl)]_2$$

The mixture was then allowed to stand for 24 hours at room temperature. The hard, white solid polymer thus obtained was dissolved in tetrahydrofuran and precipitated in a large volume of water, yielding a fibrous, white polymer. The polymeric product was then dried in a vacuum oven and the dry material was observed to have a melting point of 180°–190° C. A conversion of 85 percent based on the tetrahydrofuran charged to the reactor was realized.

*Example VIII*

To 90 parts of morpholine there was added 0.50 part of freshly distilled $B_{10}H_{10}[C(COCl)]_2$ at room temperature. After standing at room temperature for 24 hours, the resulting polymeric product was boiled in distilled water several hours and was then dried in a vacuum oven. A brown, solid polymeric material was obtained.

What is claimed is:
1. A method for the production of polymers which comprises polymerizing cyclic ethers free from non-aromatic carbon to carbon unsaturation and having not more than 6 members in the cyclic ring in the presence of the compound $B_{10}H_{10}[C(COCl)]_2$, said polymers having average molecular weights of at least 1000.
2. The method of claim 1 in which the quantity of $B_{10}H_{10}[C(COCl)]_2$ employed is from about 0.001 to 5.0 percent by weight based on the weight of the cyclic ether.
3. The method of claim 1 in which the cyclic ether is an epoxyalkane.
4. The method of claim 1 in which the cyclic ether is an oxacycloalkane.
5. The method of claim 1 in which the cyclic ether is tetrahydrofuran.
6. The method of claim 1 in which the cyclic ether is epichlorohydrin.
7. The method of claim 1 in which the cyclic ether is propylene oxide.
8. The method of claim 1 in which the cyclic ether is beta-propiolactone.
9. The method of claim 1 in which the cyclic ether is 3,3-bis(chloromethyl) oxetane.
10. The method of claim 1 in which the cyclic ether is morpholine.
11. The method for the production of polymers which comprises polymerizing tetrahydrofuran in the presence of from about 0.001 to 5.0 percent by weight of

$$B_{10}H_{10}[C(COCl)]_2$$

based on the weight of the tetrahydrofuran.
12. The method for the production of polymers which comprises polymerizing epichlorohydrin in the presence of from about 0.001 to 5.0 percent by weight of $$B_{10}H_{10}[C(COCl)]_2$$

based on the weight of the epichlorohydrin.
13. The method for the production of polymers which comprises polymerizing propylene oxide in the presence of from about 0.001 to 5.0 percent by weight of $B_{10}H_{10}[C(COCl)]_2$ based on the weight of the proplyene oxide.
14. The method for the production of polymers which comprises polymerizing beta-propiolactone in the presence of from about 0.001 to 5.0 percent by weight of $B_{10}H_{10}[C(COCl)]_2$ based on the weight of the beta-propiolactone.
15. The method for the preparation of polymers which comprises polymerizing 3,3-bis(chloromethyl) oxetane in the presence of from about 0.001 to 5.0 percent by weight of $B_{10}H_{10}[C(COCl)]_2$ based on the weight of the 3,3-bis (chloromethyl) oxetane.
16. The method for the preparation of polymers which comprises polymerizing morpholine in the presence of from about 0.001 to 5.0 percent by weight of $$B_{10}H_{10}[C(COCl)]_2$$

based on the weight of the morpholine.

References Cited by the Examiner
UNITED STATES PATENTS

| | | | |
|---|---|---|---|
| 2,706,189 | 4/1955 | Pruitt et al. | 260—2 |
| 2,906,738 | 9/1959 | Goldberg | 260—2 |
| 3,021,315 | 2/1962 | Cox et al. | 260—78.3 |
| 3,037,846 | 6/1962 | Mann et al. | 260—247 |
| 3,111,470 | 11/1963 | Marans | 260—20 |

FOREIGN PATENTS 914,438  7/1954  Germany.

WILLIAM H. SHORT, *Primary Examiner.*